United States Patent
Park et al.

(10) Patent No.: US 12,149,774 B2
(45) Date of Patent: *Nov. 19, 2024

(54) BROADCAST RECEIVING APPARATUS AND CONTROL METHOD THEREOF

(71) Applicant: SAMSUNG ELECTRONICS CO., LTD., Suwon-si (KR)

(72) Inventors: Jin-yeol Park, Seongnam-si (KR); Young-hwa Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,568

(22) Filed: Aug. 28, 2023

(65) Prior Publication Data
US 2023/0403423 A1    Dec. 14, 2023

Related U.S. Application Data

(63) Continuation of application No. 17/977,383, filed on Oct. 31, 2022, now Pat. No. 11,778,260, which is a
(Continued)

(30) Foreign Application Priority Data

Oct. 30, 2007    (KR) .......................... 10-2007-0109807

(51) Int. Cl.
*H04N 21/422*    (2011.01)
*G06F 3/01*    (2006.01)
(Continued)

(52) U.S. Cl.
CPC ....... *H04N 21/42204* (2013.01); *G06F 3/017* (2013.01); *G08C 17/00* (2013.01);
(Continued)

(58) Field of Classification Search
CPC ................ G08C 17/00; G08C 2201/30; G08C 2201/71; G04N 21/42206; H04N 21/42204; H04N 21/4316; H04N 21/47; G06F 3/017
See application file for complete search history.

(56) References Cited

U.S. PATENT DOCUMENTS 5,453,758 A    9/1995  Sato
5,554,880 A    9/1996  Metzler et al.
(Continued)

FOREIGN PATENT DOCUMENTS

DE    10 2004 008 254 A1    9/2005
EP        1 460 524 A2       9/2004
(Continued)

OTHER PUBLICATIONS

Communication dated Oct. 14, 2013 issued by the Korean Intellectual Property Office in counterpart Korean Patent Application No. 10-2007-0109807.

*Primary Examiner* — Tadesse Hailu
(74) *Attorney, Agent, or Firm* — Sughrue Mion, PLLC

(57) ABSTRACT

A method for interacting with a graphical user interface (GUI) of a television operating in a step mode in which movement of a cursor among menu items displayed on the GUI is performed stepwise in accordance with a manipulation of a direction key of the remote controller, the method including receiving, by the television, from a remote controller a signal corresponding to spatial movement of the remote controller detected by the remote controller that instructs the television to switch from (i) the step mode to (ii) a position mode of the GUI in which the movement of the cursor among the menu items is performed in accordance with the spatial movement of the remote controller and switching from the step mode of the GUI to the position mode of the GUI based on the signal.

15 Claims, 5 Drawing Sheets

Related U.S. Application Data continuation of application No. 16/019,110, filed on Jun. 26, 2018, now Pat. No. 11,516,528, which is a continuation of application No. 13/965,869, filed on Aug. 13, 2013, now Pat. No. 10,044,967, which is a continuation of application No. 12/118,858, filed on May 12, 2008, now abandoned.

(51) Int. Cl.
*G08C 17/00* (2006.01)
*H04N 21/431* (2011.01)
*H04N 21/47* (2011.01)

(52) U.S. Cl.
CPC ... *H04N 21/42222* (2013.01); *H04N 21/4316* (2013.01); *H04N 21/47* (2013.01); *G08C 2201/30* (2013.01); *G08C 2201/32* (2013.01); *G08C 2201/71* (2013.01); *H04N 21/42206* (2013.01)

(56) References Cited

U.S. PATENT DOCUMENTS

| | | |
|---|---|---|
| 5,598,187 A | 1/1997 | Ide et al. |
| 5,602,981 A | 2/1997 | Hargrove |
| 5,883,619 A | 3/1999 | Ho et al. |
| 5,926,178 A | 7/1999 | Kurtenbach |
| 6,025,869 A | 2/2000 | Stas et al. |
| 6,130,664 A | 10/2000 | Suzuki |
| 6,202,212 B1 | 3/2001 | Sturgeon et al. |
| 6,313,854 B1 | 11/2001 | Matthews et al. |
| 6,515,651 B1 | 2/2003 | Berstis |
| 6,603,420 B1 | 8/2003 | Lu |
| 6,640,337 B1 | 10/2003 | Lu |
| 6,727,929 B1 | 4/2004 | Bates et al. |
| 6,947,062 B2 | 9/2005 | Cuijpers et al. |
| 7,102,616 B1 | 9/2006 | Sleator |
| 7,239,301 B2 | 7/2007 | Liberty et al. |
| 7,301,527 B2 | 11/2007 | Marvit |
| 7,443,381 B2 | 10/2008 | Mo |
| 7,777,649 B2 | 8/2010 | De Ruyter et al. |
| 8,935,630 B2 | 1/2015 | Wroblewski |
| 10,747,338 B2 | 8/2020 | Yamamoto |
| 2002/0084909 A1 | 7/2002 | Stefanik et al. |
| 2002/0112248 A1 | 8/2002 | Takagi et al. |
| 2002/0118131 A1 | 8/2002 | Yates et al. |
| 2002/0122027 A1 | 9/2002 | Kim |
| 2002/0158920 A1 | 10/2002 | Abrams |
| 2002/0167699 A1 | 11/2002 | Verplaetse et al. |
| 2002/0174430 A1 | 11/2002 | Ellis et al. |
| 2003/0063065 A1 | 3/2003 | Lee et al. |
| 2004/0070564 A1 | 4/2004 | Dawson et al. |
| 2004/0218104 A1 | 11/2004 | Smith et al. |
| 2004/0222971 A1 | 11/2004 | Mo |
| 2005/0041045 A1 | 2/2005 | Plut |
| 2005/0125826 A1 | 6/2005 | Hunleth et al. |
| 2005/0219209 A1 | 10/2005 | Fleck et al. |
| 2005/0257174 A1 | 11/2005 | Wilson |
| 2006/0020900 A1 | 1/2006 | Kumagai et al. |
| 2006/0022939 A1 | 2/2006 | Armstrong |
| 2006/0250353 A1 | 11/2006 | Yasutake |
| 2006/0250358 A1 | 11/2006 | Wroblewski |
| 2007/0009229 A1 | 1/2007 | Liu |
| 2007/0048697 A1 | 3/2007 | Du et al. |
| 2007/0058047 A1 | 3/2007 | Henty |
| 2007/0066394 A1 | 3/2007 | Ikeda et al. |
| 2007/0080940 A1 | 4/2007 | Aoki et al. |
| 2007/0113207 A1 | 5/2007 | Gritton |
| 2007/0291007 A1 | 12/2007 | Forlines et al. |
| 2007/0291112 A1 | 12/2007 | Harris |
| 2008/0024435 A1 | 1/2008 | Dohta |
| 2008/0065989 A1 | 3/2008 | Conroy et al. |
| 2008/0106523 A1 | 5/2008 | Conrad |
| 2008/0129682 A1 | 6/2008 | Algreatly |
| 2008/0134784 A1 | 6/2008 | Jeng et al. |
| 2008/0178124 A1 | 7/2008 | Kondo et al. |
| 2008/0191898 A1 | 8/2008 | Janik |
| 2008/0259024 A1 | 10/2008 | Nam et al. |
| 2009/0002217 A1 | 1/2009 | Kryze et al. |
| 2009/0027565 A1 | 1/2009 | Dorsey |
| 2009/0059091 A1 | 3/2009 | Dorsey |
| 2009/0115723 A1 | 5/2009 | Henty |
| 2009/0322676 A1 | 12/2009 | Kerr et al. |
| 2010/0025123 A1 | 2/2010 | Lee et al. |
| 2010/0073567 A1 | 3/2010 | Lee et al. |
| 2010/0141578 A1 | 6/2010 | Horiuchi et al. |

FOREIGN PATENT DOCUMENTS

| | | |
|---|---|---|
| JP | 2001-175412 A | 6/2001 |
| KR | 10-2004-0058930 A | 7/2004 |
| KR | 10-0514736 B1 | 9/2005 |
| KR | 10-2007-0047620 A | 5/2007 |
| WO | 01/33838 A1 | 5/2001 |

# BROADCAST RECEIVING APPARATUS AND CONTROL METHOD THEREOF

CROSS-REFERENCE TO RELATED APPLICATIONS

This application is a continuation application of U.S. application Ser. No. 17/977,383, filed Oct. 31, 2022, now U.S. Pat. No. 11,778,260, which is a continuation application of U.S. application Ser. No. 16/019,110, filed on Jun. 26, 2018, now U.S. Pat. No. 11,516,528, which is a continuation application of U.S. application Ser. No. 13/965,869, filed on Aug. 13, 2013, now U.S. Pat. No. 10,044,967, in the U.S. Patent and Trademark Office, which is a continuation application of U.S. application Ser. No. 12/118,858, filed on May 12, 2008, in the U.S. Patent and Trademark Office, which claims priority from Korean Patent Application No. 10-2007-0109807, filed on Oct. 30, 2007, in the Korean Intellectual Property Office, the disclosures of which are incorporated herein by reference in their entireties.

BACKGROUND OF THE INVENTION

1. Field of the Invention

Apparatuses and methods consistent with the present invention relate to a broadcast receiving apparatus and a control method thereof, and more particularly, to a broadcast receiving apparatus which provides a graphical user interface (GUI) which a user is able to control using a pointing device, and a control method thereof.

2. Description of the Related Art

With the use of a computer mouse as an input device for a personal computer (PC), pointing devices have become increasingly used to control graphical user interfaces (GUIs) of broadcast receiving apparatuses. Pointing devices may also be used to control televisions (TVs), and recently, remote controllers additionally employing functions of a pointing device, and methods for controlling a GUI of TV using the remote controller have been developed.

Methods for moving a pointer include a position method and a step method. In the position method, the pointer continuously moves as the pointing device is moved, and in the step method, a focus moves on objects where the focus can be located, in a specified direction according to the manipulation of up, down, right, and left direction keys. A mode in which the pointer operates in the position method is referred to as a position mode, and a mode in which the pointer operates in the step method is referred to as a step mode.

When a GUI of a TV is displayed using icons, a remote controller used as a pointing device may operate in a position method so that a user may conveniently manipulate the remote controller. However, when a related art GUI requiring manipulation by direction keys is displayed, the pointer does not move in a step method, and may, therefore, be less convenient for a user than a remote controller having direction keys. If a remote controller has functions of a pointing device and direction keys, manufacturing costs increase, and a greater number of keys are required. Accordingly, user convenience is diminished.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a broadcast receiving apparatus which receives a movement pattern from a pointing device and operates using a pattern function corresponding to the pattern in order to switch the pointing device between a position mode and a step mode without having direction keys, and a control method thereof.

The present invention also provides a pointing device which transmits direction signals appropriate for the step method by movement of the pointer, and a control method thereof.

According to an exemplary aspect of the present invention, there is provided a method for controlling a graphical user interface (GUI) of a broadcast receiving apparatus, comprising receiving movement information from a pointing device; determining whether or not the movement information corresponds to a predetermined pattern; and if the movement information corresponds to the predetermined pattern, controlling the broadcast receiving apparatus to perform a function corresponding to the predetermined pattern.

The function may switch the GUI from a position mode to a step mode or vice versa.

The controlling may comprise receiving a function corresponding to a pattern set by a user; storing the function set by the user to a memory; and reading the function set by the user from the memory.

According to another exemplary aspect of the present invention, there is provided a method for controlling a pointing device according to a user movement, comprising sensing a user movement; determining whether or not the user movement corresponds to a predetermined pattern; and if the movement corresponds to the predetermined pattern, performing a function corresponding to the predetermined pattern.

The pointing device may be a remote controller for a TV.

The function may transmit a direction signal according to the movement.

The function may switch the pointing device from a position mode to a step mode or vice versa.

The movement may be that the pointing device moves on a predetermined angle in a space.

According to another exemplary aspect of the present invention, there is provided a method for controlling a GUI of a broadcast receiving apparatus, comprising receiving a selection command from a pointing device; determining whether or not the selection command selects a graphic object within the GUI; and if the selection command selects the graphic object, switching the broadcast receiving apparatus between a position mode and a step mode.

According to another exemplary aspect of the present invention, there is provided a broadcast receiving apparatus, comprising a display which displays a received broadcast; a receiving unit which receives a user input from a pointing device; and a control unit which controls the broadcast receiving apparatus to perform a function corresponding to a predetermined pattern if the user input transmitted from the receiving unit corresponds to the predetermined pattern.

The function may switch the broadcast receiving apparatus between a position mode and a step mode.

The apparatus may further comprise a memory which stores the function corresponding to the predetermined pattern set by the user.

According to another exemplary aspect of the present invention, there is provided a pointing device, comprising a sensor which senses movement of the pointing device; and a control unit which determines whether or not the movement sensed by the sensor corresponds to a predetermined pattern, and if the movement corresponds to the predetermined pattern, performs a function corresponding to the movement.

The function may transmit a command for moving one step in an up, down, right, or left direction.

The movement may be that the pointing device moves on a predetermined angle in a space.

The pointing device may be a TV remote controller.

According to another exemplary aspect of the present invention, there is provided a broadcast receiving apparatus comprising a display which displays a GUI; a receiving unit which receives a user input from a pointing device; and a control unit which switches the broadcast receiving apparatus between a position mode and a step mode if it is determined that a pointer selects a graphic object within the GUI though the movement information received from the receiving unit.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
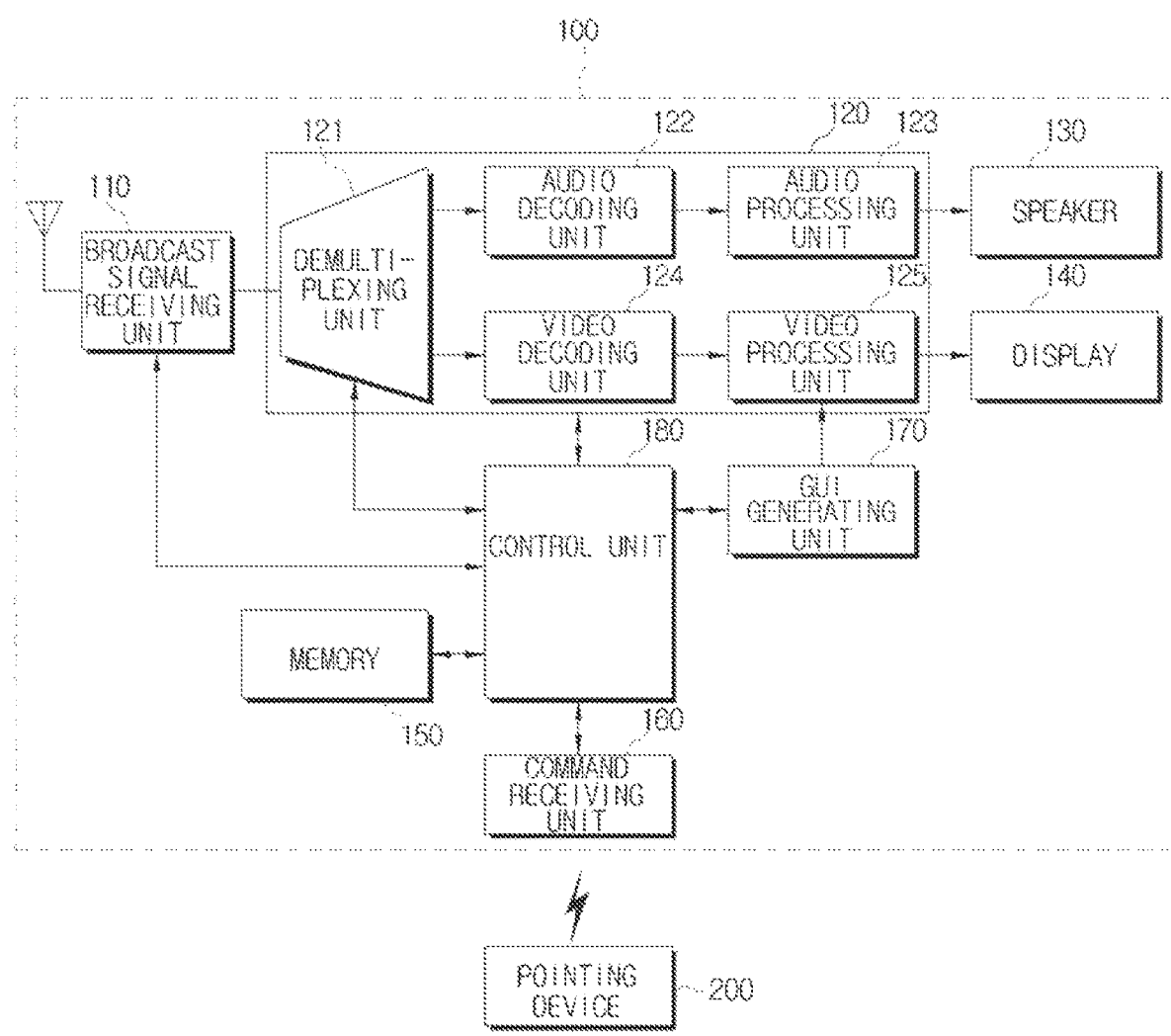
FIG. 1 is a block diagram illustrating a broadcast receiving apparatus applicable to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram illustrating a broadcast receiving apparatus applicable to an exemplary embodiment of the present invention. Referring to FIG. 1, a broadcast receiving apparatus 100 according to an exemplary embodiment of the present invention may comprise a broadcast signal receiving unit 110, a signal processing unit 120, a speaker 130, a display 140, a memory 150, a command receiving unit 160, a graphical user interface (GUI) generating unit 170, and a control unit 180.

The broadcast signal receiving unit 110 may include a tuner (not shown) which tunes to a broadcast signal transmitted from a broadcasting station, and a demodulator (not shown) which demodulates the tuned broadcast signal and corrects errors of the demodulated broadcast signal.

The signal processing unit 120 may comprise a demultiplexing unit 121, an audio decoding unit 122, an audio processing unit 123, a video decoding unit 124, and a video processing unit 125.

The demultiplexing unit 121 separates a broadcast signal demodulated by the broadcast signal receiving unit 110 into additional data such as video data, audio data, and Program and System Information Protocol (PSIP) data, and outputs the separated data as bit streams.

The audio decoding unit 122 decodes audio data separated by the demultiplexing unit 121, and outputs the decoded audio data. The audio processing unit 123 signal-processes audio data output from the audio decoding unit 122 to meet the requirements of the speaker 130, and outputs the signal-processed audio data to the speaker 130.

The video decoding unit 124 decodes video data separated by the demultiplexing unit 121, and outputs the decoded video data. The video processing unit 125 signal-processes the decoded video data to meet the requirements of the display 140, including the vertical frequency, resolution, and aspect ratio, and outputs the signal-processed video data to the display 140.

The speaker 130 and display 140 output audio and video data received from the signal processing unit 120 as sound and video, respectively.

The command receiving unit 160 includes various keys for receiving user commands input by a user, and a remote control receiving unit for receiving user commands transmitted from a pointing device 200. The command receiving unit 160 transmits a key signal corresponding to user commands received through the keys or remote control receiving unit to the control unit 180.

A user holds and moves a pointing device 200 to transmit movement information to the broadcast receiving apparatus 100.

The GUI generating unit 170 generates a pointer showing the movement of the pointing device 200 under the control of the control unit 180, and a menu or icon indicating the state of the broadcast receiving apparatus 100. That is, the GUI generating unit 170 generates a GUI which receives a user input, and a pointer which operates according to input from the pointing device 200.

The control unit 180 controls components of the broadcast receiving apparatus 100 to conduct functions according to a user command received through the command receiving unit 160, and may be embodied as a micro controller, a microprocessor, or a central processing unit (CPU).

More specifically, if the pointing device 200 moves according to a predetermined pattern, the control unit 180 reads a function corresponding to the pattern from the memory 150, and performs the corresponding function. For example, if the pointing device moves in a pattern forming the shape of the number '8', the control unit 180 detects the movement corresponding to the pattern.

The corresponding function may switch the pointing device 200 between a position mode and a step mode. The control unit 180 stores a pattern function according to a user command in the memory 150. A position method represents a method in which the pointer continuously moves when the pointing device 200 moves, and a step method represents a method in which a focus moves on objects where the focus can be located, in a specified direction when up, down, right, and left direction keys are manipulated, as explained above.

Figure 2:
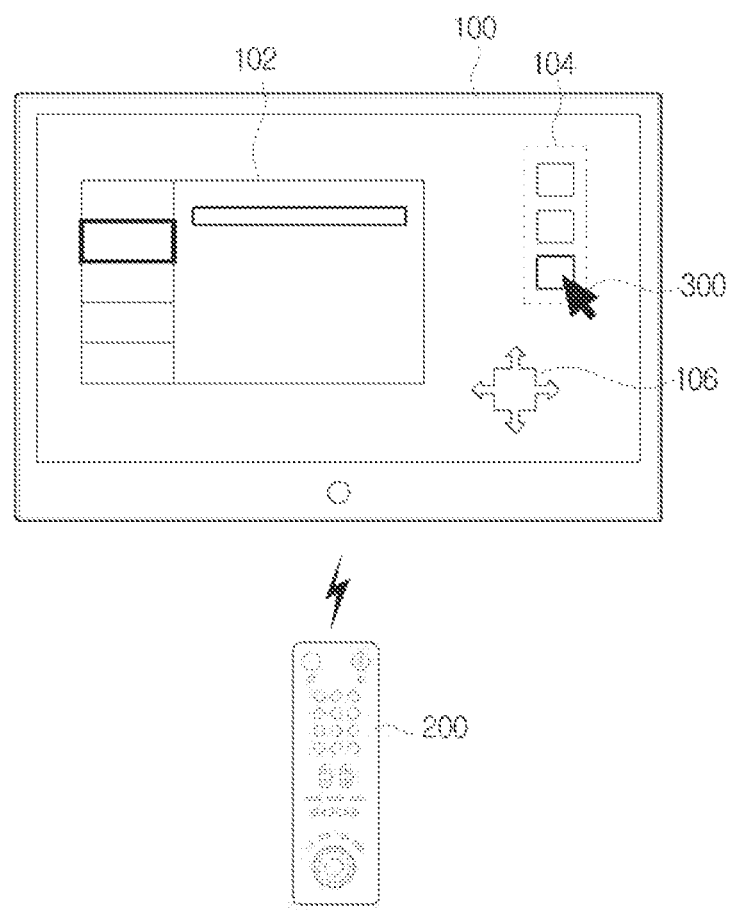
FIG. 2 is a diagram illustrating a method for controlling a GUI of a broadcast receiving apparatus using a pointing device applicable to an exemplary embodiment of the present invention.

FIG. 2 is a diagram illustrating a method for controlling a GUI of a broadcast receiving apparatus using a pointing device applicable to an exemplary embodiment of the present invention. In FIG. 2, a menu 102 is provided as a GUI which is operated in a step method, and icons 104 are provided as a GUI which is operated in a position method.

A pointer 300 receives a movement signal from the pointing device 200, and moves over the display 140 to select the menu 102 or icons 104. If a user selects a graphic object 106 within a GUI by placing the pointer 300 on the graphic object 106, a GUI control mode is switched between a position mode and a step mode. For example, when the broadcast receiving apparatus 100 is in a position mode, a GUI control mode is converted into a step mode according to the selection of the graphic object 106.

Figure 3:
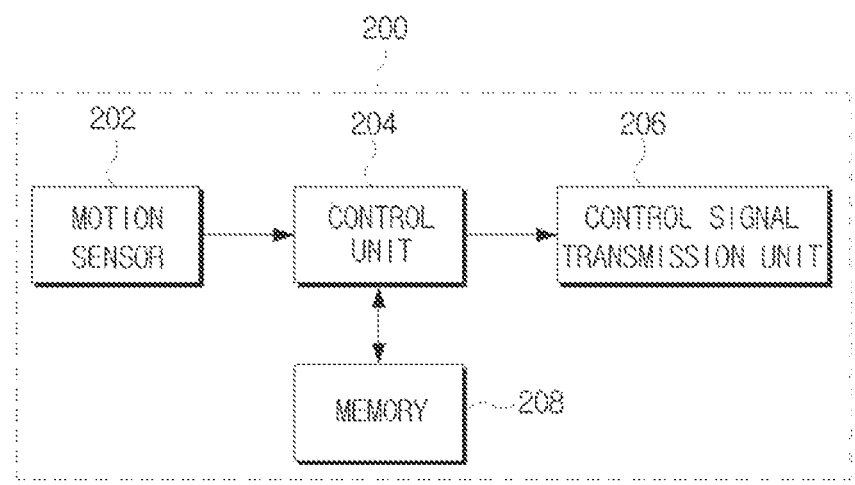
FIG. 3 is a block diagram illustrating the pointing device of FIG. 2.

FIG. 3 is a block diagram illustrating the pointing device of FIG. 2.

A motion sensor 202 senses movement of the pointing device 200 when a user holds and moves the pointing device 200.

A memory 208 stores information about pattern functions so that the pointing device 200 transmits the pattern functions corresponding to the movement of the pointing device 200 by the user.

A control signal transmission unit 206 transmits to the broadcast receiving apparatus 100 a control signal transmitted from a control unit 204, which will be explained below. The control unit 204 determines whether movement information received from the motion sensor 202 corresponds to a predetermined pattern. If it is determined that the movement information corresponds to a predetermined pattern, the control unit 204 reads a function corresponding to the predetermined pattern from the memory 208, and transmits the function to the broadcast receiving apparatus 100 through the control signal transmission unit 206. On the other hand, if it is determined that the movement information does not correspond to a predetermined pattern, the control unit 204 transmits the movement information to the broadcast receiving apparatus 100.

The pattern may be a circle drawn by the pointing device 200, and the function corresponding to the pattern may be that the pointer moves one step.

Figure 4:
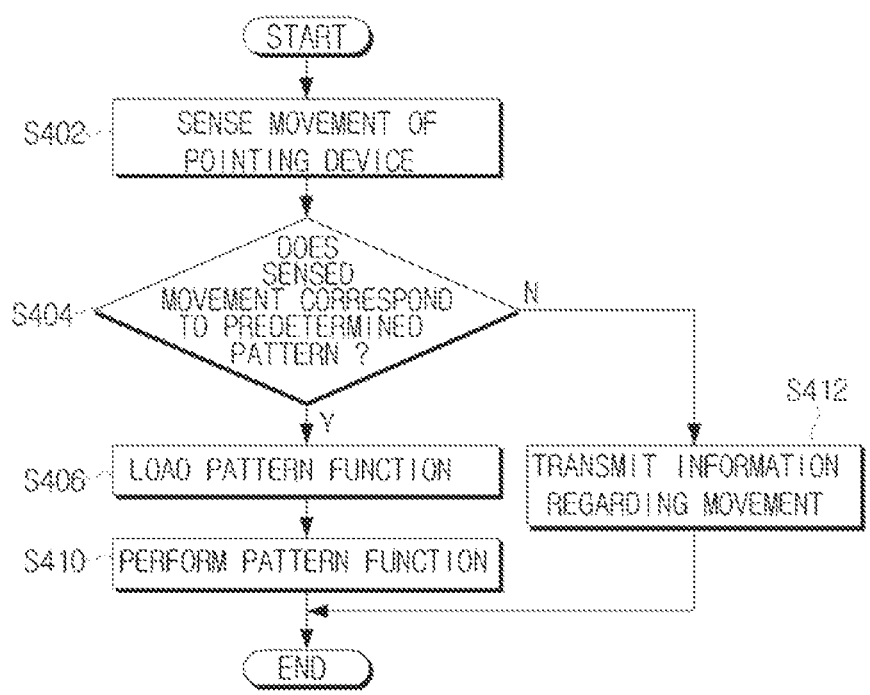
FIG. 4 is a flowchart illustrating a method of controlling a pointing device according to an exemplary embodiment of the present invention.

FIG. 4 is a flowchart illustrating a method of controlling a pointing device according to an exemplary embodiment of the present invention. The control unit 204 senses movement of the pointing device 200 (S402), and determines whether the sensed movement corresponds to a predetermined pattern (S404). If it is determined that the sensed movement corresponds to a predetermined pattern, the control unit 204 reads a function corresponding to the pattern from the memory 208 (S406), and performs the read function (S410).

If it is determined that the sensed movement does not correspond to a predetermined pattern, the control unit 204 transmits information regarding the movement to a receiving unit (S412). For example, the pattern may be that the pointing device 200 draws the shape of the number '8' in a space, and the function corresponding to the pattern may be that the pointing device 200 transmits a signal corresponding to the direction keys to the receiving unit. Alternatively, the function corresponding to the pattern may be switching between a position mode and a step mode, in which the pointing device 200 may be converted from the position mode to the step mode.

Figure 5:
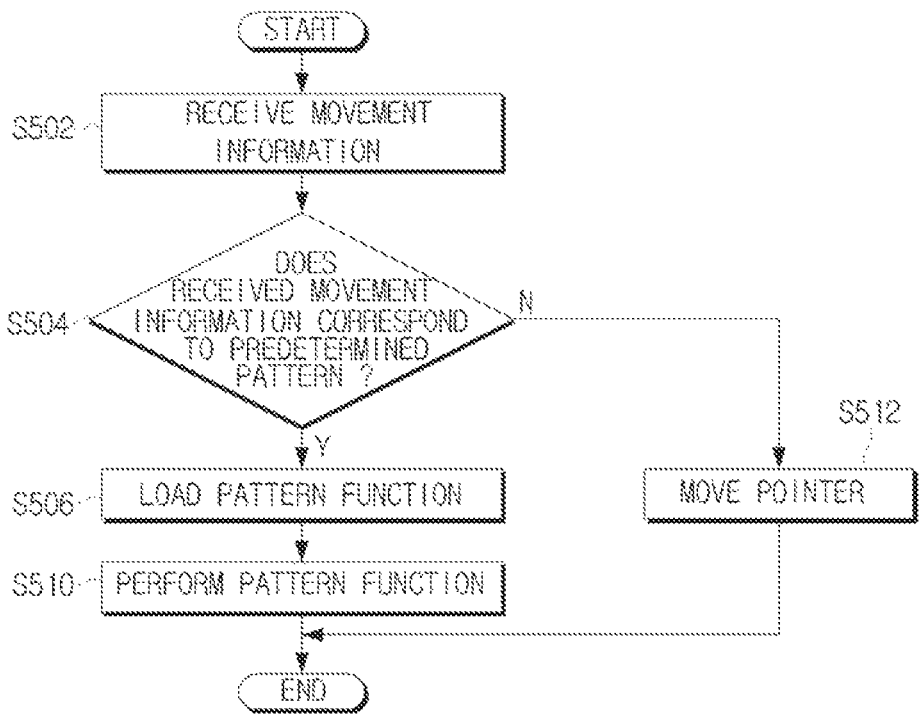
FIG. 5 is flowchart illustrating a method of controlling a GUI of a display device according to an exemplary embodiment of the present invention.

FIG. 5 is flowchart illustrating a method of controlling a GUI of a display device according to an exemplary embodiment of the present invention. The control unit 180 receives movement information from the pointing device 200 through the command receiving unit 160 (S502), and determines whether the received movement information corresponds to a predetermined pattern (S504).

If it is determined that the movement information corresponds to a predetermined pattern, the control unit 180 reads a function corresponding to the pattern (S506), and performs the function (S510). If it is determined that the movement information does not correspond to a predetermined pattern, the control unit 180 controls the GUI generating unit 170 so that a pointer moves over the display 140 according to the movement of the pointing device 200 (S512).

For example, a pattern may be that the pointing device 200 draws the shape of the number '8' in a space, and the function corresponding to the pattern may be switching between a position mode and a step mode.

Figure 6:
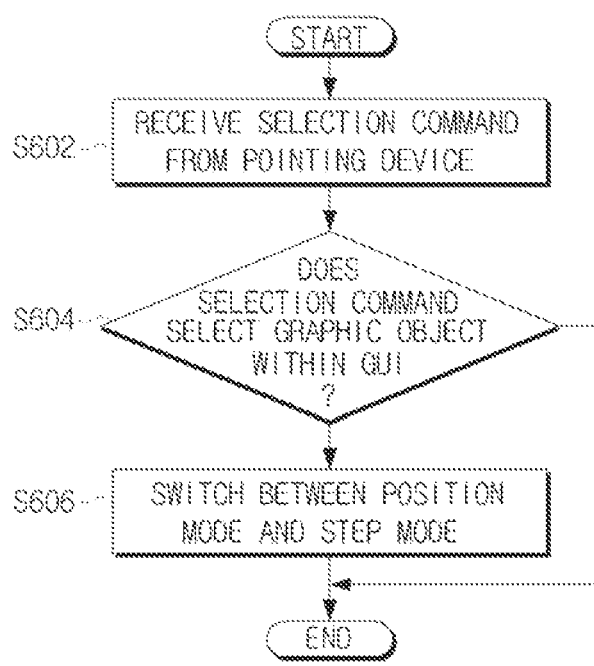
FIG. 6 is a flowchart illustrating a method of controlling a GUI of a display apparatus according to another exemplary embodiment of the present invention.

FIG. 6 is a flowchart illustrating a method of controlling a GUI of a display device according to another exemplary embodiment of the present invention.

If a selection command is received from the pointing device 200 (S602), the control unit 180 determines whether the selection command selects the graphic object 106 within the GUI (S604).

If it is determined that the graphic object 106 is selected by the selection command, the control unit 180 of the broadcast receiving apparatus switches a GUI between a position mode and a step mode (S606). For example, if the control device 180 receives a selection command from the pointing device 200 while a pointer is positioned on an icon (icon 106 of FIG. 2) for switching between a position mode and a step mode, the icon is selected. If the icon is selected, a GUI mode of the broadcast receiving apparatus 100 is switched between a position mode and a step mode.

While a position mode and a step mode are described as the GUI modes in the exemplary embodiments of the present invention described above, this should not be considered limiting. The present invention may alternatively be applied to available mode switching. A function corresponding to the pattern may be various functions of the broadcast receiving apparatus 100.

When a broadcast receiving apparatus receives functions corresponding to a pattern from a pointing device to control a GUI, mode switching is efficiently performed using the pointing device instead of direction keys.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:
1. A display system comprising:
a remote control apparatus including a motion sensor and keys, the keys comprising a left direction key, a right direction key, an up direction key and a down direction key; and a display apparatus including:
a display,
a communication unit configured to enable communications with the remote control apparatus, and
a controller configured to:
operate in a step mode in which a focus is stepwise movable among menu items displayed on the display in a direction in accordance with manipulation of the left direction key, the right direction key, the up direction key and the down direction key,
determine multi-directional spatial movements of the remote control apparatus along a spatial path sensed by the motion sensor,
obtain a signal sensed by the motion sensor based on determining the multi-directional spatial movements,
switch from the step mode to a pointing mode in which a pointer is displayed on the display and the pointer is moveable in a direction in accordance with a spatial movement of the remote control apparatus based on the signal sensed by the motion sensor and operate in the pointing mode in which the pointer is displayed on the display and moveable in accordance with the spatial movement of the remote control apparatus sensed by the motion sensor, and
switch from the pointing mode to the step mode in response to receiving, through the communication unit, a signal corresponding to manipulation of a key among the keys from the remote control apparatus.

2. The display system of claim 1, wherein the controller is configured to switch from the step mode to the pointing mode in response to receiving from the remote control apparatus, through the communication unit, signals corresponding to the multi-directional spatial movements of a predetermined pattern of spatial movement.

3. The display system of claim 2, wherein the predetermined pattern of spatial movement corresponds to the remote control apparatus drawing a shape of a numeral '8' in space.

4. The display system of claim 2, wherein the predetermined pattern of spatial movement corresponds to the remote control apparatus drawing a shape of a circle in space.

5. The display system of claim 1, wherein the controller is configured to:
determine the multi-directional spatial movements of the remote control apparatus based on movement information received from the remote control apparatus.

6. The display system of claim 1, wherein the remote control apparatus is configured to:
determine if the multi-directional spatial movements of the remote control apparatus correspond to a predetermined pattern of spatial movement, and
transmit a signal, to the display apparatus, for switching from the step mode to the pointing mode if it is determined that the multi-directional spatial movements correspond to the predetermined pattern of spatial movement.

7. The display system of claim 1, wherein the remote control apparatus is configured to transmit the signal corresponding to manipulation of a direction key from among the left direction key, the right direction key, the up direction key and the down direction key, and
the controller of the display apparatus is configured to move the focus in the step mode among the menu items displayed on the display in accordance with the signal corresponding to manipulation of the direction key, received from the remote control apparatus.

8. The display system of claim 1, wherein the controller is further configured to identify whether the signal sensed by the motion sensor indicates a predetermined pattern of spatial movement, and
wherein the predetermined pattern of spatial movement comprises a predetermined pattern of multi-directional spatial movement.

9. The display system of claim 1, wherein the controller is further configured to switch from the pointing mode to the step mode based on determining the multi-directional spatial movements correspond to a predetermined pattern of spatial movement while in the pointing mode.

10. A display apparatus comprising:
a display;
a communication unit configured to receive signals from a remote control apparatus which comprises a left direction key, a right direction key, an up direction key and a down direction key; and
a controller configured to:
operate in a first mode in which a focus is stepwise movable among menu items displayed on the display in a direction in accordance with manipulation of the left direction key, the right direction key, the up direction key and the down direction key,
determine multi-directional spatial movements of the remote control apparatus along a spatial path,
obtain one or more signals from the remote control apparatus in accordance with the multi-directional spatial movements of the remote control apparatus along the spatial path, and
switch from the first mode to a second mode in which a pointer is displayed on the display and the pointer is moveable in a direction based on the one or more signals, and operate in the second mode in which the pointer is displayed on the display and the pointer is continuously moveable in response to receiving the one or more signals.

11. The display apparatus of claim 10, wherein the controller is configured to switch from the first mode to the second mode in response to receiving from the remote control apparatus the one or more signals corresponding to the multi-directional spatial movements of a predetermined pattern of spatial movement.

12. The display apparatus of claim 11, wherein the predetermined pattern of spatial movement corresponds to the remote control apparatus drawing a shape of a numeral '8' in space.

13. The display apparatus of claim 11, wherein the predetermined pattern of spatial movement corresponds to the remote control apparatus drawing a shape of a circle in space.

14. The display apparatus of claim 10, wherein the controller is configured to:
determine if the one or more signals correspond to a predetermined pattern of spatial movement, and
switch from the first mode to the second mode if the one or more signals correspond to the predetermined pattern of spatial movement.

15. The display apparatus of claim 10, wherein the controller is configured to switch from the second mode to the first mode, in response to receiving, through the communication unit, a signal corresponding to manipulation of a key among the left direction key, the right direction key, the up direction key and the down direction key, from the remote control apparatus.

* * * * *